United States Patent
Jee et al.

(10) Patent No.: US 7,900,694 B2
(45) Date of Patent: Mar. 8, 2011

(54) AIR CONDITIONER FOR VEHICLE

(75) Inventors: Yong-Jun Jee, Daejeon (KR); Jae-Ho Kim, Daejeon (KR); Bok-Sun Kang, Daejeon (KR)

(73) Assignee: Halla Climate Control Corp., Deajeon (KR)

( * ) Notice: Subject to any disclaimer, the term of this patent is extended or adjusted under 35 U.S.C. 154(b) by 1139 days.

(21) Appl. No.: 11/569,424

(22) PCT Filed: May 23, 2005

(86) PCT No.: PCT/KR2005/001505
§ 371 (c)(1),
(2), (4) Date: Nov. 20, 2006

(87) PCT Pub. No.: WO2005/011578
PCT Pub. Date: Dec. 8, 2005

(65) Prior Publication Data
US 2007/0175622 A1    Aug. 2, 2007

(30) Foreign Application Priority Data
May 25, 2004   (KR) .................. 10-2004-0037214

(51) Int. Cl.
*B60H 1/00* (2006.01)
*F29B 29/00* (2006.01)
*B01D 53/30* (2006.01)
*B01D 39/00* (2006.01)
*B01D 46/00* (2006.01)

(52) U.S. Cl. ........... 165/202; 165/204; 165/248; 55/506; 96/111

(58) Field of Classification Search .................. 165/41, 165/42, 43, 44, 202, 203, 204, 248; 454/139; 55/493, 506; 95/11; 96/111
See application file for complete search history.

(56) References Cited

U.S. PATENT DOCUMENTS

| | | | | |
|---|---|---|---|---|
| 3,618,659 A | * | 11/1971 | Rawal | 165/248 |
| 5,053,064 A | * | 10/1991 | Hama et al. | 96/111 |
| 6,425,819 B2 | * | 7/2002 | Maruyama et al. | 454/139 |
| 6,454,834 B1 | * | 9/2002 | Livingstone et al. | 95/11 |
| 6,716,267 B2 | * | 4/2004 | Lawlor, Sr. | 55/506 |
| 2002/0013128 A1 | * | 1/2002 | Maruyama et al. | 454/139 |
| 2003/0074872 A1 | * | 4/2003 | Lawlor, Sr. | 55/493 |
| 2006/0054540 A1 | * | 3/2006 | Wong | 210/169 |

FOREIGN PATENT DOCUMENTS

| | | |
|---|---|---|
| JP | 4-110315 U | 9/1992 |
| JP | 2003-335121 A | 11/2003 |
| KR | 1999-0025260 U | 7/1999 |
| KR | 2002-0034735 A | 5/2002 |

\* cited by examiner

*Primary Examiner* — Ljiljana (Lil) V Ciric

(74) *Attorney, Agent, or Firm* — Patent Law Group LLP; Carmen C. Cook (57) ABSTRACT

An air conditioner for a vehicle includes an air conditioner case having an evaporator and a heater core installed therein and having a blower installed at an inlet thereof; a movable filter moving between an air-filtering location and an air-non-filtering location of the air conditioner case; a judging device judging whether air blown by the blower inside the air conditioner case is contaminated; and a driving device moving the movable filter to the air-filtering location when the judging device determines that the air is contaminated and to the air-non-filtering location when the judging device determines that the air is not contaminated. Therefore, when it is determined that the air is contaminated, the movable filter is moved to the air-filtering location. When it is determined that the air is not contaminated, the movable filter is moved to the air-non-filtering location.

12 Claims, 6 Drawing Sheets

AIR CONDITIONER FOR VEHICLE

DESCRIPTION

1. Technical Field

The present invention relates to an air conditioner for a vehicle. More specifically, the invention relates to an air conditioner for a vehicle, in which the filter can be moved to a location where it is not exposed to air when offensive odor is not generated, thereby extending the service life of the filter.

2. Background Art

An air conditioner for a vehicle is an apparatus for heating/cooling the interior of a vehicle in such a manner that air is blown into an air conditioner case by a blower, and heat is exchanged between the blown air and heat exchange media which pass through an evaporator and/or a heater core, thereby controlling the temperature of the air.

In such a vehicle air conditioner, as vehicles become luxurious over time, a filter is installed at the blower or the air conditioner case in order to remove dust, harmful materials, and offensive odor which are included in the air flown into the inside of the air conditioner case by the blower. The filter is generally installed at the upstream side of the evaporator. The filter is usually fixed at the place where it is installed without any displacement, and thus continuously exposed to the air blown by the blower. Accordingly, as the use time period of the filter is lengthened, adsorption capability of the filter gradually decreases, and an air passageway is blocked by the filter, thereby increasing loss of air volume. On the other hand, the adsorbed offensive odor is emitted to the inside of a vehicle, and thus gives uncomfortable feelings to a driver. Particularly, in the case where the filter is installed at the upstream side of the evaporator, the offensive odor generated by the evaporator, which is the origin of the offensive odor, is not filtered.

In order to address the problems, techniques which do not expose the filter to air are proposed, when the air flowing into a vehicle through an air conditioner for a vehicle does not odor offensive.

In Korean Patent Laid-Open Publication No. 2000-46462 proposed by the present applicant, an elastic type filter technique, which expands and contracts a filtering member of a filter installed at an evaporator, is proposed. In this case, even though the filtering member is contracted, portions of the filtering member are still exposed to air, so that the service life of the filter is shortened. In addition, such kind of a technique is also disclosed in Korean Utility Model No. 1999-25260, but the same problem as the one described above remains.

Also, in Korean Patent Laid-Open Publication No. 1999-75365 proposed by the present applicant, there is proposed a variable location type filter technique, which moves a filter to and fro at the downstream side of an evaporator. That is, as shown in FIG. 1, a filter 150 moves along a rail 160 toward the outlet of the cold air passageway P1 and the warm air passageway P2 in cooperation with a temperature control door 140 installed in order to control, between an evaporator 110 and a heater core 120 which are installed in the air conditioner case 130, the extent of opening of a cold air passageway P1 and a warm air passageway P2 of an air conditioner case 130.

DISCLOSURE OF INVENTION

Technical Problem

Figure 1:
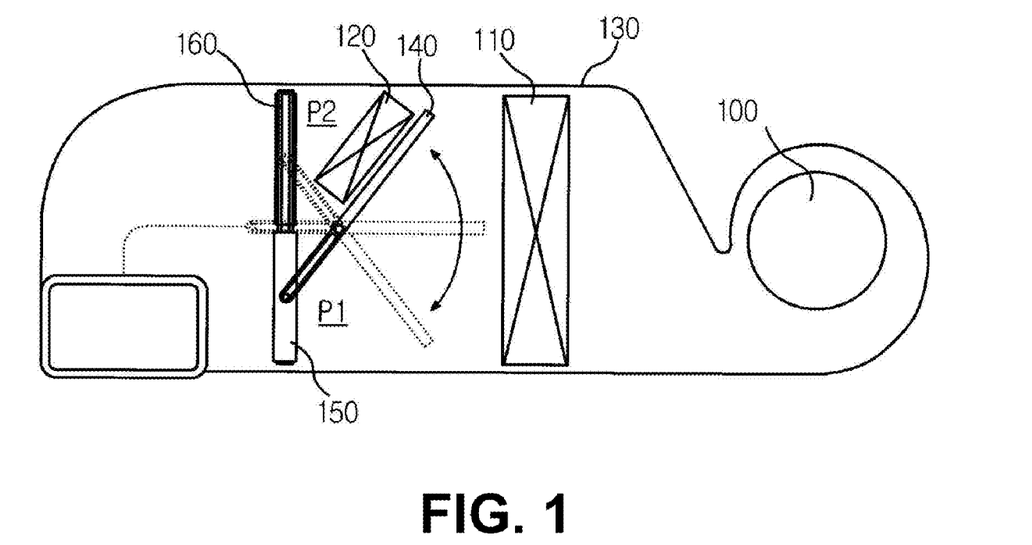
FIG. 1 is a cross-sectional view showing a conventional air conditioner for a vehicle.

However, in the technique shown in FIG. 1, since the filter 150 is continuously exposed to the air passageways, i.e. the cold air passageway P1 and the warm air passageway P2, through which the air blown by the blower 100 flows, the service life of the filter 150 is still shortened, and, when air flows both the cold air passageway P1 and the warm air passageway P2 simultaneously, the filter does not carry out its own function properly.

Figure 2:
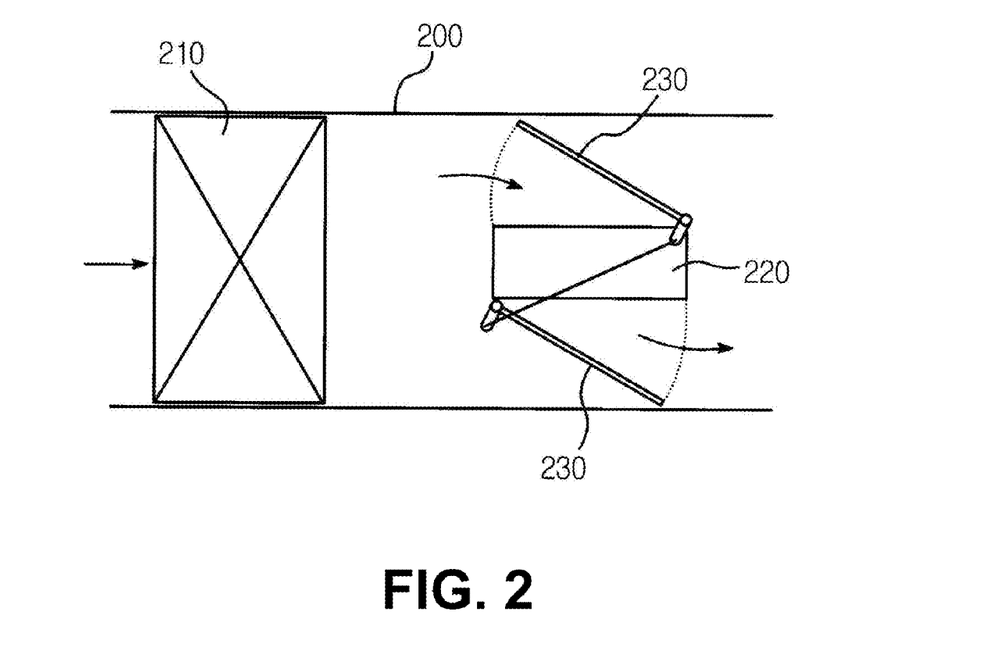
FIG. 2 is a partial cross-sectional view showing another conventional air conditioner for a vehicle.

In Japanese Patent Laid-Open Publication No. 1982-172817 shown in FIG. 2, there is proposed a technique which selectively blocks the air flowing into a filter 220 by placing the filter 220, which is opened and closed by a pair of dampers 230, at the downstream side of an evaporator 210 installed in the air conditioner case 200. However, in this case, although the service life of the filter 220 can be extended, the filter 220 and the dampers 230 are always placed in the air passageway, so that flow resistance increases, and the dampers 230 are required additionally.

Technical Solution

The present invention has been made in order to solve the above problems occurring in the prior art, and it is an object of the invention to provide an air conditioner for a vehicle, in which a filter can be moved to a location where the filter is not exposed to air when offensive odor is not emitted, thereby extending the service life of the filter.

In order to accomplish the above object, according to one aspect of the invention, there is provided an air conditioner for a vehicle. The air conditioner includes: an air conditioner case having an evaporator and a heater core installed therein and having a blower installed at an inlet thereof; a movable filter for moving between an air-filtering location and an air-non-filtering location of the air conditioner case; a judging means for judging whether air blown by the blower inside the air conditioner case is contaminated; and a driving means for moving the movable filter to the air-filtering location when the judging means determines that the air is contaminated and to the air-non-filtering location when the judging means determines that the air is not contaminated.

According to the invention, it is preferable to install a guide rail for guiding the movement of the movable filter at the air conditioner case, to form a slot corresponding to the guide rail at both side walls of the air conditioner case, and to connect a sliding arm to both ends of the movable filter in such a way as to be protruded outside the air conditioner case through the slot so as to move along the slot.

Also, a housing part may be installed at the air-non-filtering location of the air conditioner case for receiving the movable filter.

Also, the judging means may be configured so as to include a mode detecting means for detecting the air intake mode and an air contamination detection means for detecting whether contaminated air flows in, in which it is determined that the air is contaminated when the mode detecting means detects an outside air mode and the air contamination detection means detects inflow of contaminated air.

Also, if it is determined that the air is contaminated by the judging means, the air intake mode of the blower is changed to an inside air mode.

Also, while the blower is being operated, the judging means may be configured so as to determine that the air is contaminated.

Also, the judging means may be configured so as to determine that the air is contaminated when the cooling cycle starts operation through the evaporator and its operation lasts for a certain period time.

Also, the judging means may be configured so as to determine whether the air is contaminated according to the operation of an air conditioner switch or a compressor.

Also, the judging means may be configured so as to determine that the air is contaminated when the air conditioner switch is turned off and the blower starts to operate in a dehumidifying mode for removing frost, and determine that the contamination of the air is released when a predetermined time period has passed in the dehumidifying mode.

Also, when only the heating cycle is being operated through the heater core, the judging means may be configured so as to determine that the air is not contaminated.

Also, the judging means is further provided with a wind pressure or a wind volume detecting means, and, when it is determined that the wind pressure or the wind volume inside the air conditioner case is below a predetermined value by the wind pressure or the wind volume detecting means, the judging means controls the driving means so as to move the movable filter to the air-non-filtering location, and notifies a user of the time for replacing the movable filter.

Also, the judging means further comprises a manipulation switch, which can move the movable filter to the air-filtering location or the air-non-filtering location by a user's manipulation.

BRIEF DESCRIPTION OF THE DRAWINGS

Further objects and advantages of the invention can be more fully understood from the following detailed description taken in conjunction with the accompanying drawings, in which.

MODE FOR THE INVENTION

The preferred embodiments of the present invention will be hereafter described in detail with reference to the accompanying drawings.

Figure 3:
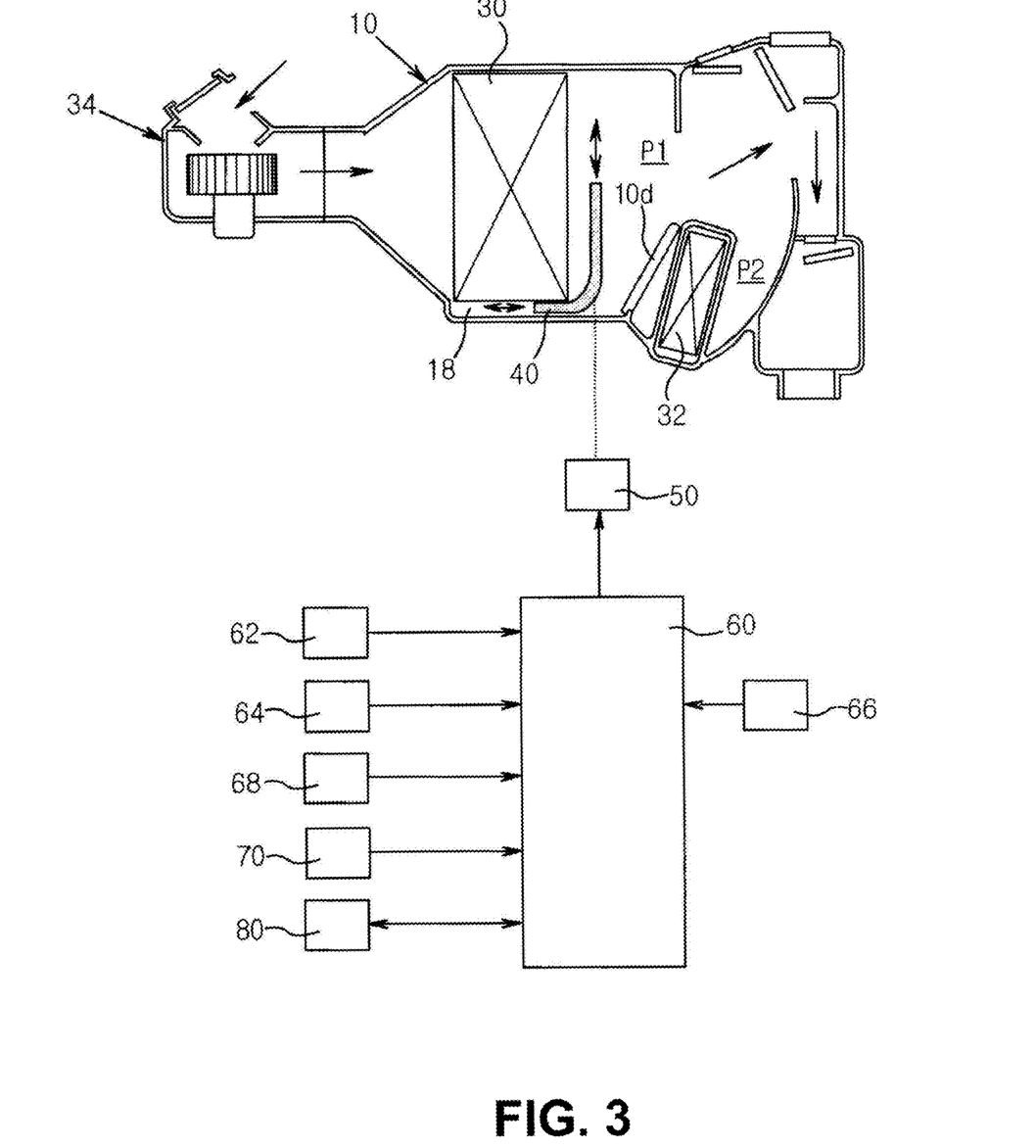
FIG. 3 is a schematic configuration view showing an air conditioner for a vehicle according to one embodiment of the invention.

As shown in FIG. 3, an air conditioner for a vehicle according to the invention comprises an air conditioner case 10 having an evaporator 30 and a heater core 32 contained therein and having a blower 34 installed at an inlet thereof; and a movable filter 40 moving from an air-filtering location (i.e., the fluid passageway where air flows) of the air conditioner case 10 to an air-non-filtering location (i.e., the location where air does not flow) of the air conditioner case 10. In addition, a temperature control door 10d controlling the extent of opening of a cold air passageway P1 and a warm air passageway P2 is installed in the air conditioner case 10. The heater core 32 is installed at the warm air passageway P2, and the evaporator 30 is installed at the upstream side of the heater core 32.

Figure 4:
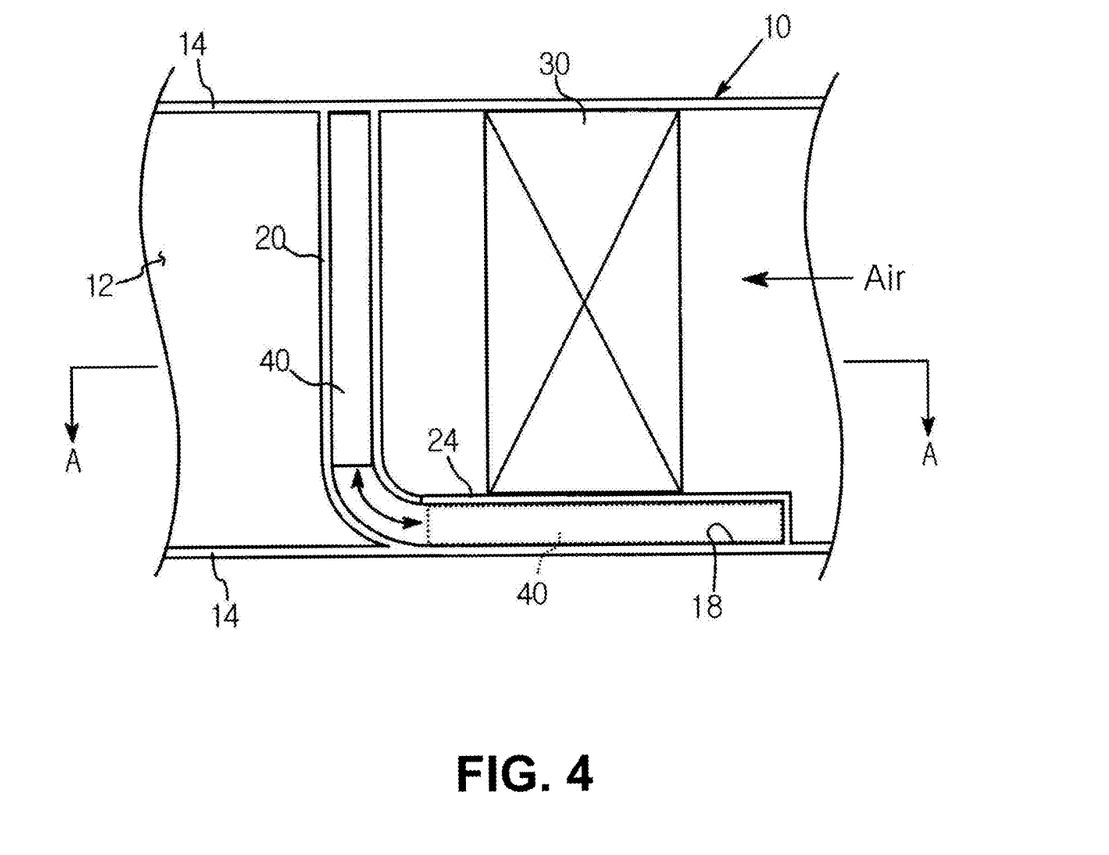
FIG. 4 is a cross-sectional side view showing a major portion of the air conditioner for a vehicle according to the invention.

Also, as shown in FIG. 4, extending from the both side walls 12, 12 of the air conditioner case 10 to the air-non-filtering location (for example, the bottom 14 of the air conditioner case 10), a guide rail 20 guiding the movement of the movable filter 40 can be formed respectively. In this case, a housing part 18 for receiving the movable filter 40 is preferably installed at the bottom 14 of the air conditioner case 10, i.e. the air-non-filtering location. Accordingly, the movable filter 40 is received by the housing part 18 along the guide rail 20, or withdrawn from the housing part 18 to be moved to the downstream side of the evaporator 30, i.e. air-filtering location, and can perform filtering function against the air blown by the blower 34.

In order to move the movable filter 40 as described above, as shown in FIG. 5, a slot 22 corresponding to the guide rail 20 is formed at both side walls 12, 12 of the air conditioner case 10 respectively. In addition, a sliding arm 42, which is protruded outside the air conditioner case 10 through the slots 22 so as to be moved along the slot 22, is connected to both sides of the movable filter 40. The sliding arm 42 can be moved, for example, by a driving means 50 including a cam device, a lever device, or the like, which are not shown in the drawings, and the movable filter 40 can be moved along the guide rail 20 according to the movement of the sliding arm 42.

Figure 5:
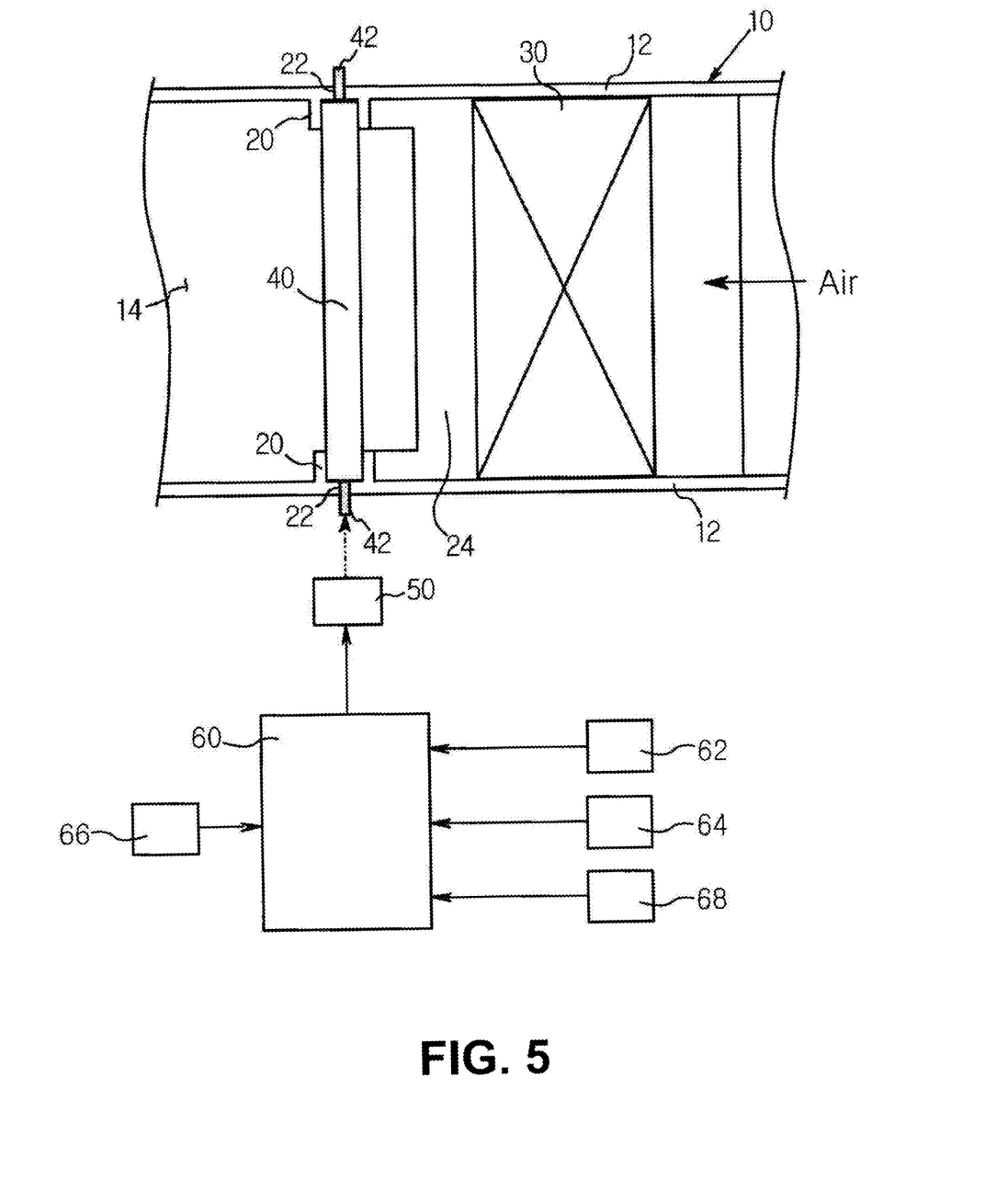
FIG. 5 is a cross-sectional view taken along the line A-A in FIG. 4.

In order to filter dust or harmful materials in the air and deodorize as well the offensive odor generated by the evaporator 30 which is the practical origin of the offensive odor, the guide rail 20 is preferably formed on both side walls 12, 12 of the air conditioner case 10, extending from the downstream side 30 of the evaporator 30 to the portion under the evaporator 30. That is, the movable filter 40 is moved from the downstream side of the evaporator 30, i.e. air-filtering location, to the housing part 18, i.e. air-non-filtering location, along the guide rail 20, or is withdrawn from the housing part 18 and blocks the downstream side of the evaporator 30, i.e. air-filtering location, thereby performing selectively the filtering function against the air which has passed the evaporator 30.

Also, in this embodiment, in order to prevent the movable filter 40 from being contaminated by the condensed water generated by the evaporator 30 and flows downwardly by the weight of the water itself, as shown in FIGS. 4 and 5, the portion of the both guide rails 20 under the evaporator 30, which is the air-non-filtering location, is preferably connected to a blocking plate 24. In this case, the condensed water can be discharged toward the side walls 12 of the air conditioner case 10 along the top surface of the blocking plate 24.

Figure 6:
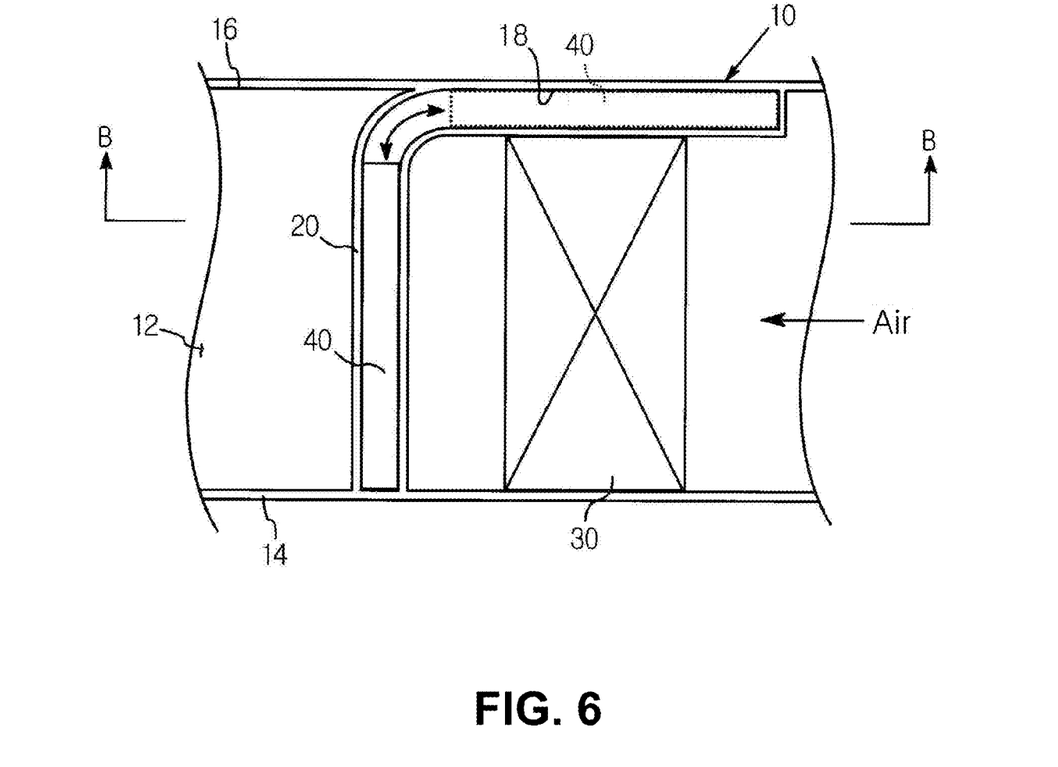
FIG. 6 is a cross-sectional side view showing a major portion of an air conditioner for a vehicle according to another embodiment of the invention.
Figure 7:
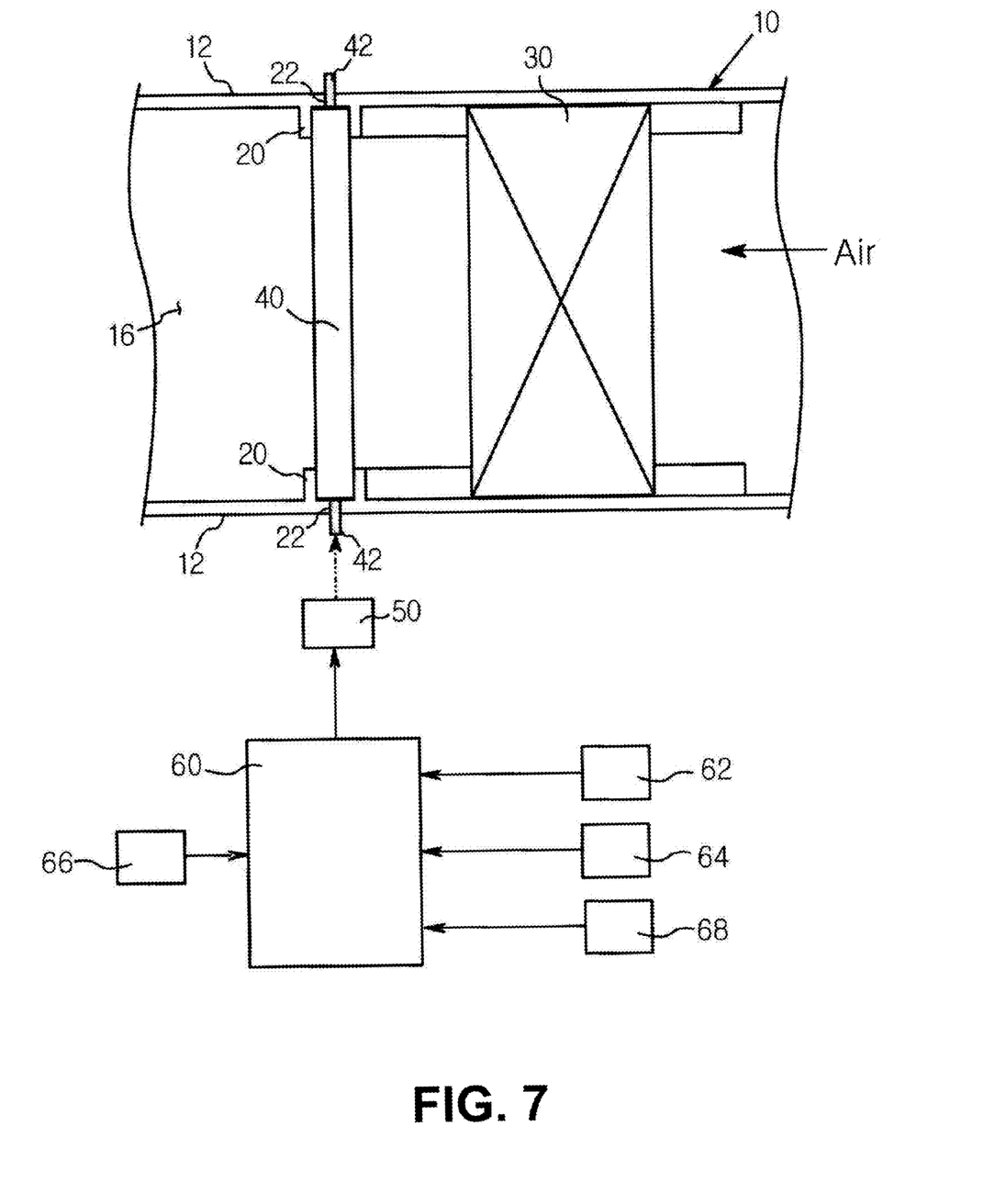
FIG. 7 is a cross-sectional view taken along the line B-B in FIG. 6.

On the other hand, another embodiment of the air conditioner according to the invention is shown in FIGS. 6 and 7.

In this air conditioner, the guide rail guiding the movement of the movable filter 40 is installed extending from the both wall sides 12, 12 of the air conditioner case 10, for example, to the ceiling 16 of the air conditioner case 10, i.e. air-non-filtering location, respectively, and a housing part 18 receiving the movable filter 40 is installed on the ceiling.

Therefore, the movable filter 40 is moved, as needed, from the downstream side of the evaporator 30, i.e. air-filtering location, along the guide rail 20 and is received by the housing part 18 on the ceiling 16, i.e. air-non-filtering location, or is withdrawn from the housing part 18 and placed so as to filter air by blocking the downstream side of the evaporator 30, i.e. air-filtering location, thereby selectively filtering the air which has passed the evaporator 30.

On the other hand, the judging means 60 determines whether the air flowing into the air conditioner case 10 is contaminated. According to the judgment of the judging means 60, the judging means 60 controls the driving means 50 so that the movable filter 40 may be moved to the air-filtering location when the air is contaminated, and the judging means 60 controls the driving means 50 so that the movable filter 40 may be moved to the air-non-filtering location when the air is not contaminated.

The judging means 60 includes a mode detecting means 62 for detecting the air intake mode and an air contamination detection means 64 for detecting inflow of the contaminated air.

For example, when the mode detecting means 62 detects that the air intake mode is in an outside air mode and the air contamination detection means 64 detects that the contamination level exceeds a predetermined value, the judging means 60 is configured so as to determine that the air is contaminated. If it is determined by the judging means 60 that the air is contaminated, the driving means 50 is controlled so as to move the movable filter 40 to the air-filtering location. In addition, the air intake mode of the blower 34 can be changed to an inside air mode. On the contrary, when the air intake mode is in the inside air mode, and the contamination level is below the predetermined value, the movable filter 40 is moved to the air-non-filtering location.

That is, regardless of cooling/heating, when the contamination level is above a predetermined value in the outside air mode, it is determined that the air is contaminated, so that the movable filter 40 is moved to the air-filtering location, and the air intake mode can be changed additionally to the outside air mode. When the contamination level is below the predetermined value in the outside air mode or inside air mode, it is determined that the air is released from the contamination, so that the movable filter 40 is moved to the air-non-filtering location.

In addition, the judging means 60 can be configured so as to determine that the air is contaminated while the blower 34 is being operated, and when the judging means 60 determines that the air is contaminated, the driving means 50 is controlled so as to move the movable filter 40 from the air-non-filtering location to the air-filtering location. On the contrary, when the operation of the blower 34 is stopped, the movable filter 40 is moved to the air-non-filtering location.

That is, regardless of cooling/heating, if the blower 34 is being operated, it is determined that the air is contaminated, and the movable filter 40 is moved to the air-filtering location, and, when the operation of the blower 34 is stopped, it is determined that the air is released from the contamination, and the movable filter 40 can be moved to the air-non-filtering location.

In addition, the judging means 60 may be configured so as to determine whether the air is contaminated according to the operation of an air conditioner switch 70 or a compressor 80.

For example, the judging means can be configured so as to determine that the air is contaminated when the cooling cycle starts operation through the evaporator 30 by turning on the operation of the air conditioner switch 70 and the compressor 80 which configures the cooling cycle, and its operation lasts for a certain period of time (for example, 5 minutes). If the judging means 60 determines that the air is contaminated, the driving means 50 is controlled so as to move the movable filter 40 from the air-non-filtering location to the air-filtering location.

In addition, when the operation of the air conditioner switch 70 and the compressor 80 is off, or the operating time passes the predetermined time period (for example, 5 minutes) after the cooling cycle starts operation, or a predetermined time period has passed since the first cycling of the compressor 80, or a predetermined time period has passed maintaining the off state while the compressor 80 is cycling, or the temperature of the evaporator 30 goes up above a predetermined temperature, it is determined that the air is released from the contamination, and, in this case, the driving means 50 is controlled so as to move the movable filter 40 from the air-filtering location to the air-non-filtering location.

That is, summarizing the judgment criteria for the air contamination which relates to the operation of the cooling cycle described above, while the operation of the air conditioner switch 70 and the compressor 80 is in an on state, the judging means 60 determines whether the air is contaminated, and then, according to the conditions such as whether the cycling of the air conditioner switch 70 and the compressor 80 is off, the operating time period of the cooling cycle, and the temperature of the evaporator, the judging means 60 determines whether the contamination of the air is released. According to such judgments, the movable filter 40 is moved to the air-filtering location or air-non-filtering location by the driving means 50, thereby performing the filtering function against the air selectively. In addition, while the compressor 80 is cycling, if the compressor 80 operates continuously during the operation of the cooling cycle, the temperature of the evaporator goes down more than needed, and the surface of the evaporator is frosted, so that the heat exchange decreases. Therefore, by detecting the temperature of the evaporator, the on-off of the compressor 80 is controlled so as to maintain the temperature properly, e.g. about 4?, and, generally, the judgment criteria described above has been applied considering the offensive odor emitted severely at the first cycling of the compressor 80.

The judgment criteria described above, which relate to whether the cooling cycle is being operated, for judging the contamination and the release of the contamination have been considered that the offensive odor, generally, is severely emitted at the initial stage of the operation of the cooling cycle, and the generation of the offensive odor from the cool air gradually decreases as the operating time passes by, and the generation of the offensive odor due to the condensed water decreases if a predetermined time period passes and the temperature of the evaporator goes up above a predetermined temperature after turning off the compressor 80.

Also, when the air conditioner switch 70 is turned on and off in the dehumidifying mode for removing frost and the blower is being operated, the judging means determines that the air is contaminated, and if it is determined that the air is contaminated by the judging means 60, the movable filter 40 can be moved to the air-filtering location by the driving means 50. In addition, when a predetermined time period (for example, 5 10 minutes) has passed in the dehumidifying mode, the judging means 60 determines that the contamination of the air is released, and if it is determined that the air is released from the contamination by the judging means 60, the movable filter 40 can be moved to the air-non-filtering location by the driving means 50.

That is, when the dehumidifying mode is in operation, drying the remaining condensed water takes longer time as the operating time passes by, and, if the condensed water is dried up completely, it is determined that the contamination of the air is released, so that the movable filter 40 is moved from the air-filtering location to the air-non-filtering location.

On the other hand, when only the heating cycle is being operated through the heater core 32 by the operation of a temperature manipulation switch (not shown), the judging means 60 can be configured so as to determine that the air is not contaminated.

That is, when the heating cycle is being operated, the cooling cycle which is being operated through the evaporator 30 stops operating, and the temperature control door 10d operates so as to block the cold air passageway P1 and to open the warm air passageway P2, so that the air blown by the blower 34 passes through the evaporator 30 and the heater core 32. Accordingly, the blown air changes to warm air while passing the heater core 32, therefore the inside temperature of the air conditioner case 10 goes up. In this way, if the temperature of the air conditioner case 10 goes up, the remaining condensed water is dried up completely and offensive odor is not emitted, so that the judging means 60 controls the driving means 50 so as to move the movable filter 40 to the air-non-filtering location.

In addition, the judging means 60 is further provided with a wind pressure or a wind volume detecting means 66, and move the movable filter 40 to the air-non-filtering location when the inside wind pressure or wind volume is less than a predetermined value, and, in this case, the time to replace the movable filter 40 is preferably notified to a user using a warning means.

In addition, the judging means 60 further includes a manipulation switch 68, which can move the movable filter 40 to the air-filtering location or the air-non-filtering location. In this case, a user recognizes the contamination of the air inside a vehicle by the sense of odor and controls the movement of the movable filter 40 arbitrarily. For example, if the manipulation switch 68 is turned on, the movable filter 40 is moved to the air-filtering location by the driving means 50, and, if the manipulation switch 68 is turned off, the movable filter 40 is moved to the air-non-filtering location by the driving means 50.

The following table 1 illustrates the entire algorithms for judging the air contamination described above in order for an easy to know reference.

TABLE 1

| Category | Detecting Factors | Judgment of Air Contamination | Judgment of Release of Air Contamination | Note |
| --- | --- | --- | --- | --- |
| when contaminated air flows in | inside/outside air mode volume of contaminated air | outside air mode above the contamination criteria | inside air mode under the contamination criteria | inter/outside air mode switching |
| when blower operates | blower on/off | blower on | blower off | cooling/heating is not affected |
| operating cooling cycle | air conditioner switch and compressor on/off | air conditioner switch and compressor on | air conditioner switch and compressor off predetermined time period (5 minutes) passes after starting cooling cycle time elapsed since initial cycling of the compressor when cycling compressor, predetermined off time passed evaporator temperaturehigher than predetermined temperature | 1. offensive odor emits at the initial stage of cooling cycle2. offensive odor decreases after predetermined, time penod passes since operating cooling cycle |
| Dehumidifying mode | Air conditioner switch and blower on/off | Air conditioner switchon→off continues blower on | Predetermined time period (5-10 minutes) passed since operating cooling cycle | consider time for drying remaining condensed water in dehumidifying mode |
| heating | operating temperature manipulation switch | | Temperature manipulation switchIn heating state | air dry by warm air |
| Time to replace movable filter | wind pressure/ wind volume | wind pressure/ wind volume is under predetermined value | | notify time to replace filter |
| arbitrary manipulation | manipulation switch on/off | manipulation switch on | manipulation switch off | arbitrary user manipulation |

Hereafter, the operation of the air conditioner for a vehicle according to the invention configured as described above is explained.

When the air, which flows inside a vehicle through the air conditioner for a vehicle according to the invention, odors offensive, that is, when it is determined that the air is contaminated by the judging means 60, the judging means 60 controls the driving means 50 so as to move the movable filter 40 placed at the air-non-filtering location of the air conditioner case 10 to the air-filtering location of the air conditioner case 10 (i.e., the location blocking the downstream side fluid passageway of the evaporator 30). Accordingly, the air, blown by the blower 34 installed at the inlet of the air conditioner case 10, passes through the evaporator 30 and then passes through the movable filter 40, and thus the dust and harmful constituents included in the air are filtered, and the odor emitted by the evaporator 30, which is the origin of the offensive odor, can be removed.

Also, when the offensive odor is not emitted, that is, when it is determined that the air is not contaminated by the judging means 60, the movable filter 40 at the air-filtering location of the air conditioner case 10 is moved to the air-non-filtering location of the air conditioner case 10 and is received by the housing part. Accordingly, the movable filter 40 is not exposed to the air and maintains adsorption capability, thereby extending the service life of the movable filter 40. Furthermore, the flow resistance inside the air conditioner case 10 can be decreased.

Also, according to the judgment of a user s sense of odor recognizing the contamination of the air inside a vehicle, the manipulation switch 68 is controlled on and off, and the movable filter 40 is moved to the air-filtering location or air-non-filtering location, so that the filtering function against the air can be performed selectively.

INDUSTRIAL APPLICABILITY

As explained above, in the air conditioner for a vehicle according to the present invention, when it is determined that the air is not contaminated, the movable filter 40 at the air-filtering location in the air conditioner case 10 is moved to the air-non-filtering location in the air conditioner case 10, and thus the movable filter 40 is not exposed to air, so that the service life of the movable filter 40 is extended maintaining the adsorption capability, thereby extending the replacing period of the movable filter 40. Also, when the movable filter 40 is moved to the air-non-filtering location, the flow resistance inside the air conditioner case 10 can be decreased.

Also, in the present invention, the movable filter 40 is placed at the downstream side of the evaporator 30 so as to filter dust and harmful constituents included in air and remove the offensive odor generated by the evaporator 30, so that the effect of removing the offensive odor can be enhanced.

In the present invention, the movable filter 40 placed at the downstream side of the evaporator 30 is explained as an example in order to enhance the effect of removing offensive odor. However, the movable filter 40 can be installed anywhere from the air inlet of the blower 34 to the outlet of the air conditioner case 10, and, in this case, whatever configuration, in which the movable filter 40 can be moved from the air-filtering location to the air-non-filtering location when the it is determined that air is not contaminated, is included in the scope of the present invention.

The invention claimed is:

1. An air conditioner for a vehicle comprising:
an air conditioner case (10) having an evaporator (30) and a heater core (32) installed therein and having a blower (34) installed at an inlet thereof;
a movable filter (40) for moving between an air-filtering location and an air-non-filtering location of the air conditioner case;
a judging means (60) for judging whether air blown inside the air conditioner case by the blower is contaminated; and
a driving means (50) for moving the movable filter to the air-filtering location when the judging means determines that the air is contaminated and to the air-non-filtering location when the judging means determines that the air is not contaminated.

2. The air conditioner for a vehicle according to claim 1, wherein a guide rail (20) for guiding the movement of the movable filter (40) is installed in the air conditioner case (10), a slot (22) corresponding to the guide rail is formed at both side walls of the air conditioner case, and a sliding arm (42) is connected to both ends of the movable filter in such a way as to be protruded outside the air conditioner case through the slot so as to move along the slot.

3. The air conditioner for a vehicle according to claim 1, wherein a housing part (18) for receiving the movable filter (40) is installed at the air-non-filtering location of the air conditioner case.

4. The air conditioner for a vehicle according to claim 1, wherein the judging means (60) includes a mode detecting means (62) for detecting the air intake mode and an air contamination detection means (64) for detecting whether contaminated air flows in, wherein it is determined that the air is contaminated when the mode detecting means detects an outside air mode and the air contamination detection means detects inflow of contaminated air.

5. The air conditioner for a vehicle according to claim 4, wherein, if the judging means (60) determines that the air is contaminated, the blower (34) is configured so as to change the air intake mode to an inside air mode.

6. The air conditioner for a vehicle according to claim 1, wherein, when the blower (34) is being operated, the judging means (60) is configured so as to determine that the air is contaminated.

7. The air conditioner for a vehicle according to claim 1, wherein the judging means (60) is configured so as to determine that the air is contaminated when the cooling cycle starts operation through the evaporator (30) and its operation lasts for a certain period of time.

8. The air conditioner for a vehicle according to claim 1, wherein the judging means (60) is configured so as to determine whether the air is contaminated according to the operation of an air conditioner switch (70) or a compressor (80).

9. The air conditioner for a vehicle according to claim 1, wherein the judging means (60) is configured so as to determine that the air is contaminated, when an air conditioner switch (70) is turned off and the blower (34) starts to operate in a dehumidifying mode for removing frost, and determine the contamination of the air is released when a predetermined time period has passed in the dehumidifying mode.

10. The air conditioner for a vehicle according to claim 1, wherein, when only the heating cycle is being operated through the heater core (32), the judging means (60) is configured so as to determine that the air is not contaminated.

11. The air conditioner for a vehicle according to claim 1, wherein the judging means (60) is further provided with a wind pressure or a wind volume detecting means (66), and, when it is determined that the wind pressure or the wind volume inside the air conditioner case (10) is below a predetermined value by the wind pressure or the wind volume detecting means, the judging means (60) controls the driving means (50) so as to move the movable filter (40) to the air-non-filtering location, and notifies a user of the time for replacing the movable filter.

12. The air conditioner for a vehicle according to claim 1, wherein the judging means (60) further comprises a manipulation switch (68), which can move the movable filter (40) to the air-filtering location or the air-non-filtering location by a user's manipulation.

* * * * *